US008667523B2

(12) United States Patent
Gupta

(10) Patent No.: US 8,667,523 B2
(45) Date of Patent: Mar. 4, 2014

(54) SYSTEMS AND METHODS FOR SOLICITING FEEDBACK USING PRINT-AUGMENTED BROADCAST SIGNAL

(75) Inventor: Ajay Gupta, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 11/572,818

(22) PCT Filed: Apr. 25, 2005

(86) PCT No.: PCT/IN2005/000124
§ 371 (c)(1), (2), (4) Date: Jan. 29, 2007

(87) PCT Pub. No.: WO2006/035450
PCT Pub. Date: Apr. 6, 2006

(65) Prior Publication Data
US 2007/0250850 A1 Oct. 25, 2007

(51) Int. Cl.
*H04N 7/173* (2011.01)

(52) U.S. Cl.
USPC ............ 725/24

(58) Field of Classification Search
None
See application file for complete search history.

(56) References Cited

U.S. PATENT DOCUMENTS 4,694,490 A * 9/1987 Harvey et al. ........ 380/234
4,811,103 A * 3/1989 Casey ........ 348/565
5,343,239 A * 8/1994 Lappington et al. ........ 725/136
5,734,413 A * 3/1998 Lappington et al. ........ 725/141
5,903,262 A * 5/1999 Ichihashi et al. ........ 725/136
6,014,688 A * 1/2000 Venkatraman et al. ........ 709/206
6,415,438 B1 * 7/2002 Blackketter et al. ........ 725/136
6,535,880 B1 * 3/2003 Musgrove et al. ........ 707/10
6,665,873 B1 * 12/2003 Van Gestel et al. ........ 725/136
7,373,247 B2 * 5/2008 Park ........ 701/208
7,603,430 B1 * 10/2009 Artz et al. ........ 709/217
2002/0078171 A1 * 6/2002 Schneider ........ 709/218
2002/0152091 A1 10/2002 Nagaoka et al.
2004/0117857 A1 * 6/2004 Bisdikian et al. ........ 725/141
2005/0155062 A1 * 7/2005 Hiltunen ........ 725/46

FOREIGN PATENT DOCUMENTS

EP 0113436 A2 7/1984
FR 2780228 A1 12/1999
WO WO/99/67904 12/1999
WO WO03034735 A1 4/2003

* cited by examiner

*Primary Examiner* — Oschta Montoya

(57) ABSTRACT

A process for providing a print-augmented broadcast signal for transmission to one or more convention broadcast receiver includes receiving a broadcast signal comprising a program portion for a particular broadcast program and a non-program portion. Supplemental content which is associated with the program content of the particular broadcast program is additionally received. Next, the supplemental content is combined onto the non-program portion of the broadcast signal to form a print-augmented broadcast signal, the print-augmented broadcast signal comprising the program content, which can be rendered on a conventional broadcast receiver, and the supplemental content, which is printable on-demand at a destination conventional broadcast receiver substantially concurrently with the rendering of the program content.

25 Claims, 9 Drawing Sheets

SYSTEMS AND METHODS FOR SOLICITING FEEDBACK USING PRINT-AUGMENTED BROADCAST SIGNAL

FIELD OF INVENTION

The present invention relates to systems and methods for soliciting audience feedback. More specifically, it relates to systems and methods for soliciting audience feedback using print-augmented broadcast signals.

BACKGROUND

Television and radio broadcasting technologies are very well suited for providing content to audience (i.e. viewers and listeners) on a mass scale. Especially in developing countries where opportunities for entertainment are limited, televisions and radios provide the largest audience for the entertainment media. Businesses are also heavily relying upon radio and television broadcastings to advertise their products in the most cost effective way. Government entities also use radio and television broadcasts to reach as many people as possible in conveying information or warning of an impending dangerous condition.

While broadcasting is very effective in disseminating program content, it is less effective in maintaining contact with the audience and soliciting feedback therefrom. For example, interactions with the audience are important for certain broadcast situations where feedback in the form of voting and comments are required from the audience. Existing methods for interacting with the audience includes using interactive TV, SMS or internet.

Interactive TV uses digital television broadcasting technology. A broadcast standard such as the DVB-RCS provides a return channel as a mechanism for viewers to send feedback to the broadcasters. While this method of obtaining feedback from the viewers is intuitive, its use is restricted to only viewers with the appropriate interactive TV system which is not widely deployed due to its high cost of ownership comparing to the conventional television set. Further disadvantages associating with interactive TV include multiple viewers watching the same TV set not able to give different feedbacks and the system not able to support answers to open ended questions. This is because the answers are typically made through a remote controller which is good for making a selection using the 0 to 9 numerical buttons.

For feedback using SMS, the broadcasters typically announce the question over the broadcast channels (i.e. either through TV or radio broadcast) along with the response options to be sent to a specified number. The audience is expected to enter their responses and send an SMS to the specified number. The broadcasters can also choose to have multiple numbers for different answers. This method, which makes use of the widely available cellular networks and cell phones, is successfully deployed in many parts of the world for obtaining audience participation in TV and radio programs. However, this method suffers from drawbacks including: (i) cumbersome entering the text message using the cell phone keypad; (ii) difficulties remembering the response options and specified numbers; (iii) audience is distracted from the programming while entering the message on the cell phone; and (iv) any erroneous formatting of the entry, which is a common mistake, makes the response illegible and in some cases void.

Making use of the Internet for interacting with the audience is another method. Occasionally, broadcasters solicit feedback from the audience by inviting them to visit the broadcasters' websites or through electronic mails (emails). This method is most suited for soliciting feedback comments as oppose to YES or NO answers or answers to multiple choice questions. However, since the audience is expected to provide the feedback only after the broadcasting, it leads to substantial reduction in the number of audience members who would go through the trouble of logging onto the Internet and provide such feedback.

Therefore, it is desirable to provide systems and methods for soliciting feedback from the audience addressing at least some of the limitations described above.

BRIEF DESCRIPTION OF THE DRAWINGS

Embodiments of the invention are herein described, purely by way of example, with reference to the accompanying drawings, in which.

DETAILED DESCRIPTION

Figure 1A:
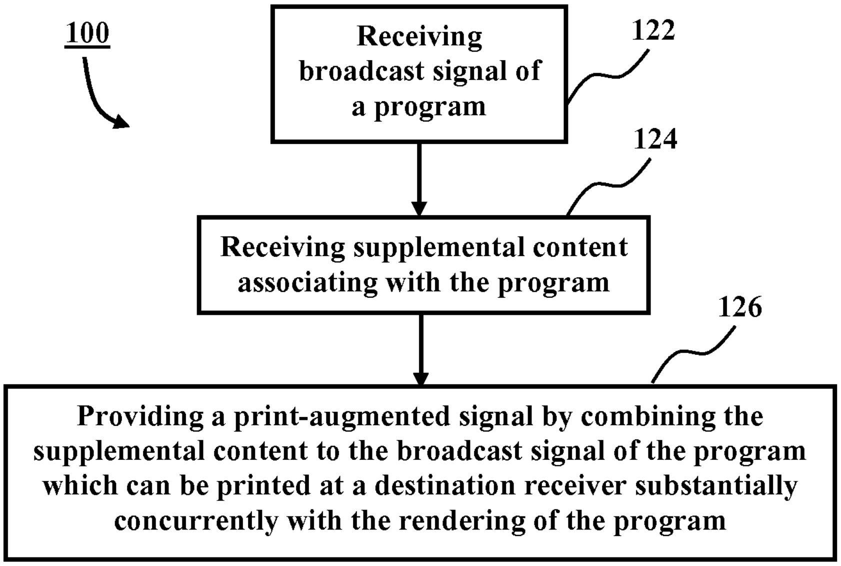
FIG. 1A illustrates a method for providing a print-augmented broadcast signal for transmission to a conventional broadcast receiver in accordance with an embodiment of the present invention.

For clarity and convenience, the following definitions are used herein:

The term "print-augmented broadcast signal" refers to a broadcast signal of a standard television or radio program (i.e. having a standard program content) which has "supplemental content" added to the broadcast signal. The print-augmented broadcast signal has the format of the original television or radio broadcast signal. Typically, the supplemental content is modulated to a non-program portion of the broadcast signal while the program content is carried on a program portion of the broadcast signal "Supplemental content" defines information and data which are complementary and specific to the standard program content communicated by the broadcast signal, and, further particularly, is specific to the standard program content conveyed by the particular segment of the broadcast signal. The supplemental content is able to be printed on a printer, reproduced on an electronic device, or stored in a data storage device at the receiving end, in an embodiment, substantially concurrently with the rendering of the standard program content to which the supplemental content is associated.

Also used herein, the description "non-program portion" refers to the portion of the broadcast signal (radio or television, analog or digital) which is reserved for conveying information different from the standard program content. The non-program portion of the broadcast signal is the vehicle by which the supplemental content is conveyed to the receiver. Exemplary embodiments non-program portion of the broadcast signal include the vertical blanking interval (VBI) of an analog television signal or an equivalent signal portion of digital television broadcast signal (referred to as DVB-VBI and DVB-TXT in the Digital Video Broadcast (DVB) Standard), as well as equivalents in the radio broadcasting field, e.g., the programming associated data channel in a digital audio broadcast signal.

The term "conventional broadcast receiver" refers to radio and/or television receivers which are primarily dedicated to the function of receiving radio and/or television broadcasts, respectively, and which having demodulation circuitry operable to extract standard program content from the print-augmented broadcast signal which has the same format of the broadcast signal. "Conventional radio receivers/sets" within this definition include digital audio radios as described below, although other digital and/or analog receivers operable to separate standard programming and non-programming content from a radio broadcast signal may be employed in alternative embodiments.

"Conventional television receivers/sets" within this definition include analog television sets, such as those configured to process broadcast signals transmitted in NTSC, PAL and SECAM broadcast formats, digital televisions receivers, such those operable to process HDTV broadcasts and the like. Specifically excluded from "conventional broadcast receivers" are systems, such as computers, which can be programmed or otherwise modified to emulate the functionality of a commonly known television or radio receiver. Such systems do not have as its primary function to receive and process such broadcast signals, and are not specifically dedicated to operate as broadcast receivers, and accordingly are not within the scope of the present disclosure.

The term "conventional" as used with regard to broadcast, radio, or television receivers/sets refers to the primary functionality of the broadcast receiving system as described, and does not refer to the timing of when such a broadcast system was developed or deployed, which may be at any time during the past, present or future.

The terms "print" or "printable" as used herein in conjunction with the term "supplemental content" mean that the supplemental content can be presented or reproduced either in hardcopy form as printed on a printer or in electronic form as displayed on an electronic device.

Systems and methods for soliciting feedback from audience using print-augmented broadcast signals according to embodiments of the invention are described hereinafter with reference to the accompanying drawings. The systems and methods enable simple and effective feedback from audience of television or radio programs by providing a feedback form in the print-augmented broadcast signal for broadcasting. At the receiving end, the feedback form is recovered from the print-augmented broadcast signal and subsequently delivered to an electronic device such as a cell phone, PDA, personal computer, and the like devices, where the audience can provide feedback in the feedback form in electronic form and returns the completed feedback form to the broadcaster or an alternative entity as specified in the return address in the feedback form. Alternatively, feedback form recovered from the print-augmented broadcast signal can be delivered to a printer for printout and subsequently, the completed feedback form may be faxed to the entity specified in the feedback form.

FIG. 1A illustrates a method 100 for providing a print-augmented broadcast signal for transmitting to one or more conventional broadcast receivers according to an embodiment. The method may be performed at a broadcast station or other entity which produces the broadcast program. Initially at step 122, a conventional broadcast signal is received. The broadcast signal includes standard program content for a particular radio or television broadcast. The broadcast signal also includes a non-program portion onto which a supplemental content can be combined (e.g. by modulating the signal representation of the supplement content onto the non-program portion of the broadcast signal). The supplemental content which is associated with the particular broadcast program is received in step 124. At step 126, the supplemental content is combined onto the non-program portion of the broadcast signal to form a print-augmented broadcast signal. The print-augmented broadcast signal includes the standard program content, which can be rendered on a conventional broadcast receiver, and the supplemental content, which can be printed or reproduced on-demand at a destination conventional broadcast receiver.

Figure 1B:
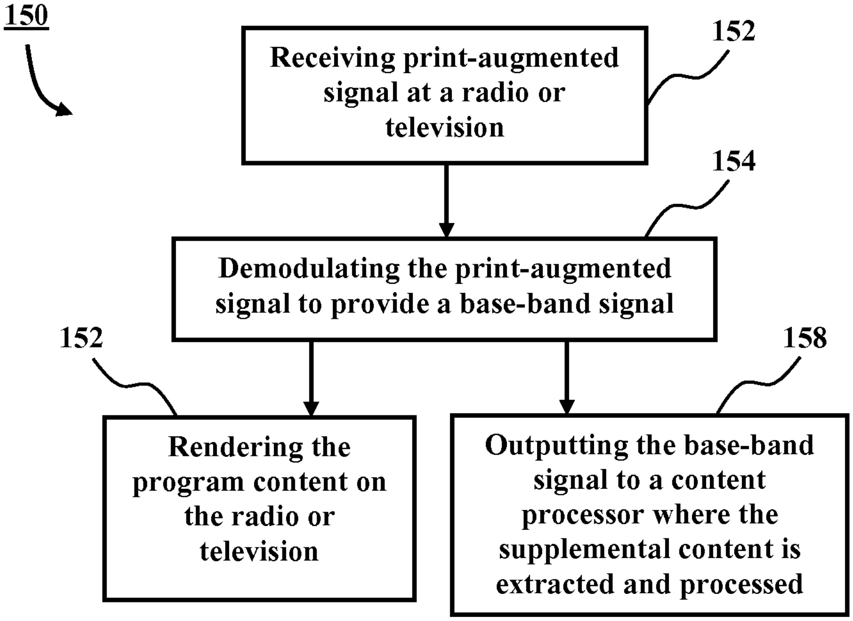
FIG. 1B illustrates a method for processing a received print-augmented broadcast signal in accordance with an embodiment of the present invention.

FIG. 1B illustrates a method 150 for processing a received print-augmented broadcast signal according to an embodiment. The method may be employed in a television or radio receiver which receives the print-augmented broadcast signal. Initially at step 152, the print-augmented broadcast signal is received by a conventional broadcast receiver. Subsequently at step 154, the received print-augmented broadcast signal is demodulated to provide a base-band signal which contains the standard program content and the supplemental content. At step 156, the standard program content is rendered on the conventional broadcast receiver in the conventional manner. Substantially at the same time as step 156, the base-band signal is output to a content processor in step 158 where the supplemental content is extracted and processed. At the content processor, the supplemental content is printable or reproducible on-demand substantially concurrently with the rendering of the program content.

Television Print-Augmented Broadcast Signal

As known in the art of analog television broadcasting, the vertical blanking interval (VBI) is a non-program portion of the television broadcast signal which can be used to carry extra information and data. Presently, teletext information, perhaps most used widely in Europe, is conveyed by modulating the information onto the non-program portion of the television broadcast signal. In this manner the vertical blanking index creates another "channel" by which the content of another program can be conveyed.

More recently, a variety of digital video broadcast (DVB) standards are also used for broadcasting programs via satellite (DVB-S), cable (DVB-C), terrestrial (DVB-T), or via handheld and mobile terminals (DVB-H). Similar to the VBI standards of analog TV broadcast signals, DVB broadcast signals also allow the simulcasting of supplemental content data through DVB-TXT or DVB-VBI. When a digital broadcasting system is employed, the DVB-TXTNBI standard is used to deliver the supplemental content as described in the foregoing. For convenience, the description "vertical blanking interval" shall refer to the vertical blanking interval of the analog broadcast television signal, as well as the equivalent portion of the digital broadcast television signal.

Figure 2A:
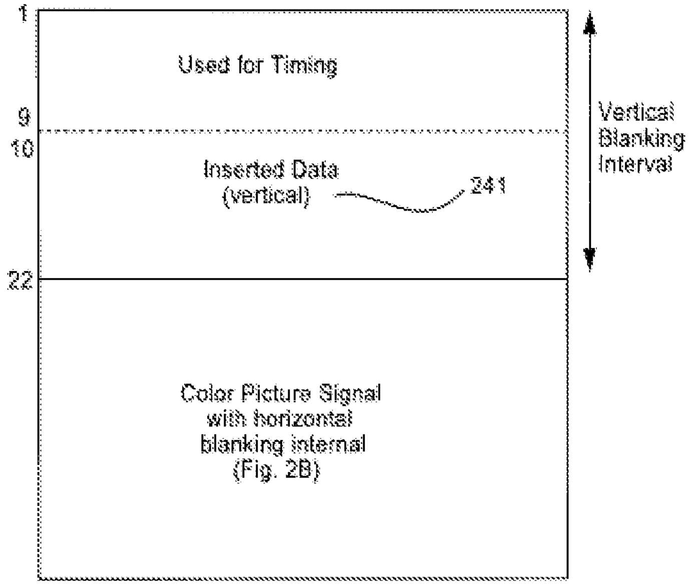
FIG. 2A illustrates the location of vertical blanking interval in a conventional broadcast television signal employed in an embodiment of the present invention.

FIG. 2A illustrates the location of a VBI in a conventional television broadcast signal employed in the embodiments. Data 241 can be inserted in the VBI lines, wherein, in the case of NTSC, these VBI lines are lines 10 to 22. Typically, teletext and closed-caption information are carried within these VBI lines.

Figure 2B:
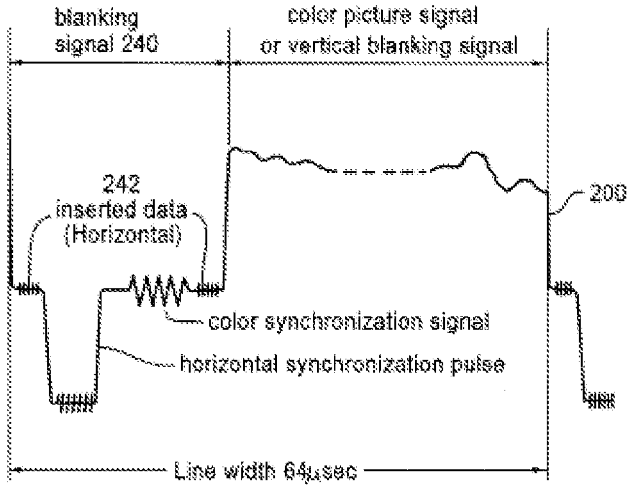
FIG. 2B illustrates a horizontal blanking interval in a conventional broadcast television signal employable in an embodiment of the present invention.

FIG. 2B illustrates a horizontal blanking interval (HBI) in an analog television signal which may also be employed in the embodiments instead of the VBI. Data 242 which is combined onto the horizontal blanking portion 240 is not displayed on the television screen with the standard program content, as the television tuner is operable to process only the standard program content embedded in the other portions of the television broadcast signal 200. Accordingly, references made to VBI herein also extend to HBI.

In a teletext system, a separate channel of information is formed by modulating various types of information, such as news, sports, advertisements, and so on, onto the VBI of the television broadcast signal. Typically, the various types of information do not have any correlation with the particular standard program content of the broadcast signal 200. In an embodiment, the VBI is utilized to transport supplemental content specific to the standard program content of the particular broadcast signal 200. In a further embodiment, the supplemental content modulated onto a particular VBI represents a supplemental content associating with the standard program content embedded in adjacent program portions of the broadcast signal. In this way, each program segment may have a different supplemental content associated therewith and the supplemental content can be accessed substantially concurrently with the rendering of the segment of the standard program content at the conventional television set.

Figure 3A:
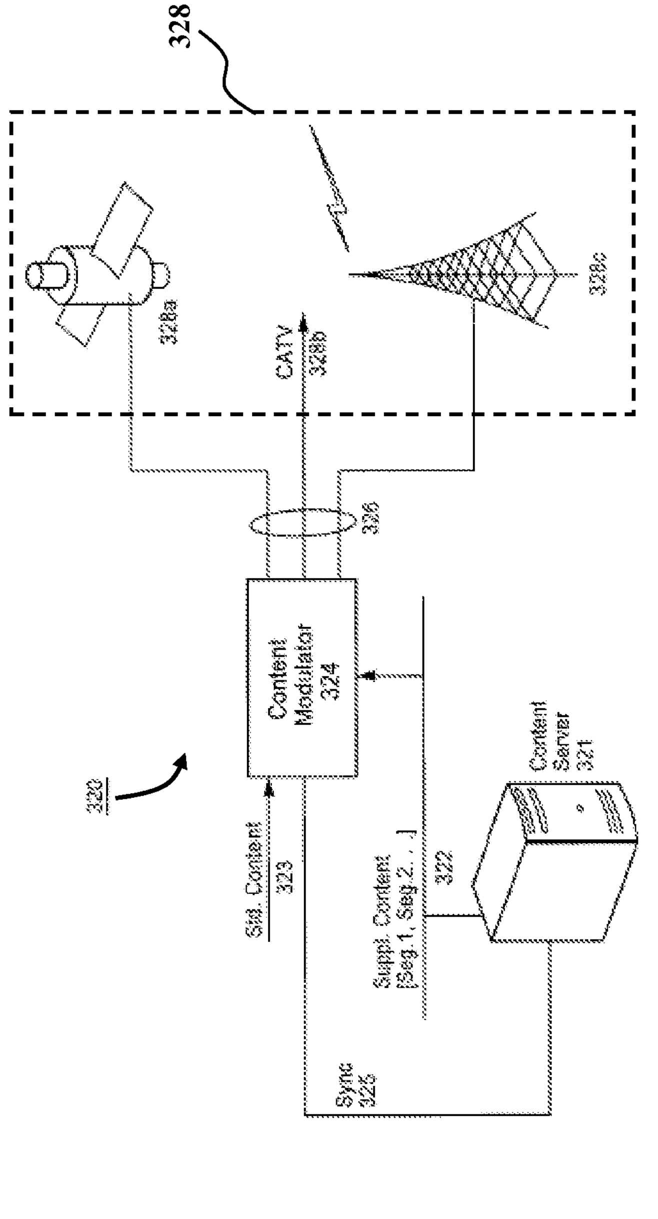
FIG. 3A illustrates a system for providing a print-augmented broadcast signal in accordance with an embodiment of the present invention.
Figure 3B:
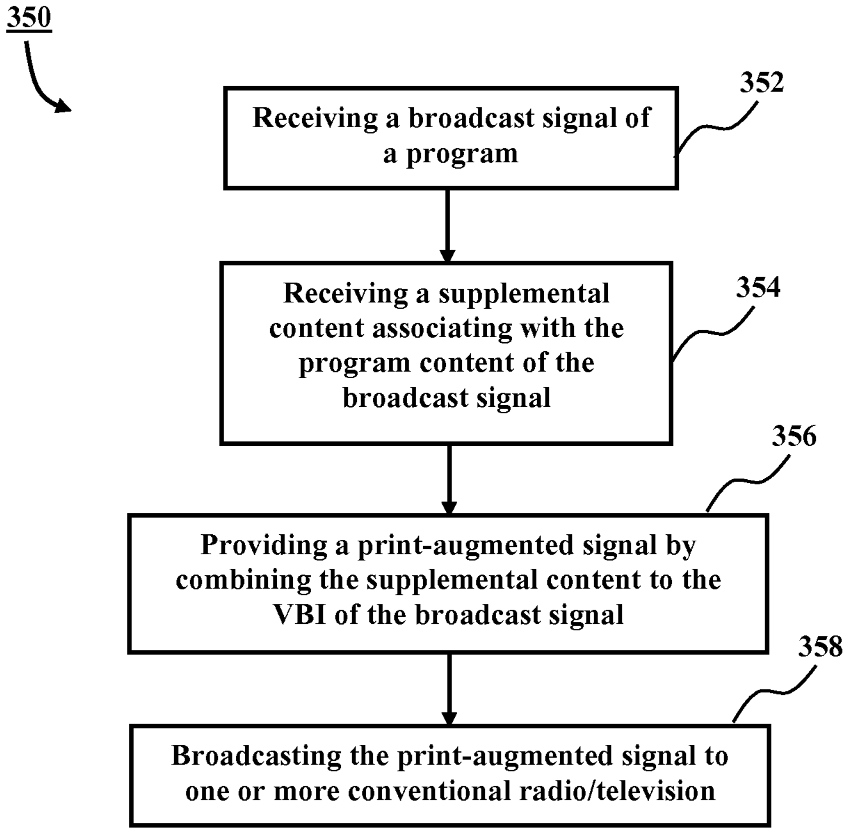
FIG. 3B illustrates a method for providing a print-augmented broadcast signal in accordance with an embodiment of the present invention.

An embodiment of a system 320 and corresponding method 350 for providing a print-augmented broadcast signal are illustrated in FIGS. 3A and 3B respectively. Referring first to the system 320 illustrated in FIG. 3A, the system 320 includes a content server 321, a content modulator 324 and a broadcast means 328, which may include a satellite transmitter 328*a*, a cable television transmitter 328*b*, or a transmitting tower 328*c*. These broadcasting means are only exemplary, and other transmitter embodiments will be apparent to those skilled in the art.

The content server 321 is operable to provide supplemental content 322 which is associated solely with a particular broadcast program. Supplemental content 322 may include further information concerning standard program content 323 of the particular broadcast program, such as additional facts, figures or other data, contact information such as a telephone number, physical or email addresses, or the like information which is specific to the standard program content of the particular broadcast program. Further, identifying information such as the version number, size, copyright/digital-right status, author and language of the supplemental content file may be included. Additionally, program-specific advertiser/sponsor information may be included in the supplemental content 322. For example, a list of manufacturers who provide the cooking equipment shown in the cooking program. In another embodiment, the supplemental content 322 may include interactive information which is designed to create an interactive session with the television viewers. Such information may include viewer queries which poses questions as to the content of the particular broadcast program, and which invites a response thereto. A particular embodiment of this type of process is further described below. Those skilled in the art will appreciate that other types of supplemental content may be included.

The supplemental content 322 may be parsed into two or more segments with each segment corresponds to a different segment of the standard program content. For example, a cooking show may describe the processes of preparing several different dishes. Supplemental content 322 may accordingly include different content segments which include details regarding recipes, recommended cooking times, and so on for the different dishes. The content segments are accordingly sequenced so that the supplemental content contained therein is synchronized with the corresponding segments of the standard program content 323 received by the content modulator 321. This process may be facilitated by the use of a synchronization signal 325 communicated between the content server 321 and the content modulator 324.

In an embodiment, the supplemental content 322 is organized into a structured file or document, such as an extensible markup language (XML) document. As such, the supplemental content 322 includes meta-data which is tagged using known and/or broadcast industry adopted tags and fields. For example, identification of a sponsor/advertiser associated with one or more of segments of the supplemental content may be identified using a meta-data tag "Sponsor ID". Other meta-data tags corresponding to additional information may also be used. For example, meta-data tag "Lang ID" may be used to identify the language of the supplemental content, "Date ID" to identify the composition date of the supplemental content, "DRM ID" to identify digital rights management information, "Exp ID" to identify an expiration date associated with the supplemental content, and "Enc ID" to identify encryption information applied to the supplemental content. The aforesaid tags represent only a small sample of the possible meta-data tags and types of information which can be conveyed, and other meta-data tags may be used alternatively to or in addition thereto in other embodiments.

Furthermore, the structure document is linked (i.e., associated) with the particular broadcast program, either as one complete document which contains one or more segments of the supplemental content, or as a document having only a single segment of the supplemental content. In the latter case, two or more such documents are used to compose the entire stream of supplemental content 322 with each document being linked to a corresponding segment of the standard program content. The supplemental content 322, in this exemplary embodiment, includes both the supplemental content associating with the standard program content and identifying information (e.g., "Sponsor ID") in XML meta-data file.

Referring to FIG. 3B in which the corresponding method 350 for providing the print-augmented broadcast signal is illustrated. Initially at step 352, the content modulator 324 receives a standard television broadcast signal that carries the standard program content 323 of the broadcast program. In one embodiment, the standard program content 323 typically includes the previously produced audio/video portions of the program, the supplemental content identifying information, sponsor/advertiser information, or other program related content are also provided in the content server 321. In another embodiment, however, such as televised sports programs, the standard program content 323 is produced in real-time. Thus, the corresponding supplemental content 322 (for example, the batting average of a currently displayed baseball player at-bat which may be prepared beforehand), is supplied to the content modulator 321 synchronously with the live program data.

In a step 354, the content modulator 321 receives the supplemental content 322 associating with the standard program content 323 from the content server 321. Subsequently in step 356 (also referring to FIG. 3A), the supplemental content 322 is modulated onto the VBI of the broadcast signal carrying the standard program content 323 to form a print-augmented broadcast signal 326. Additional processes may be used to complement the modulation processes. For example, a forward error correcting algorithm may be applied to the supplemental content 322 to improve transmission reliability. Of course, other coding algorithms may be used in alternative embodiments.

In an embodiment, the modulation process is synchronized such that segments of the supplemental content 322 are modulated onto the vertical blanking intervals occurring on the broadcast signal portion which carries the corresponding segments of the standard program content. The print-augmented broadcast signal 326 retains the signal waveform of the original television broadcast signal, and can therefore be processed by a conventional television set.

In step 358 (also referring to FIG. 3A), the print-augmented signal 326 is subsequently provided to the desired transmitting apparatus (e.g., a satellite transmitter 328*a*, cable television transmitter 328*b*, or television broadcast tower 328*c*) for broadcasting to conventional television sets. As used herein, the term "conventional television set" refers to conventional analog television sets, such as those configured to process broadcast signals transmitted in NTSC format, using, for example, North American Basic Teletext Standard (NABTS), PAL and SECAM broadcast formats, using, for example, the European Broadcast Union (EBU) Teletext Standards. In a further embodiment, the term "conventional television set" includes digital televisions receivers, such those operable to process HDTV broadcasts using, for example, the Vertical Ancillary Data Standard (VANC), and the like standard. Notwithstanding specific references made herein, the term "conventional television set" extends to television sets primarily operable to receive broadcast standards, regardless of when it is developed, which employ a non-program portion of the broadcast signal onto which the supplemental content can be modulated.

Figure 4A:
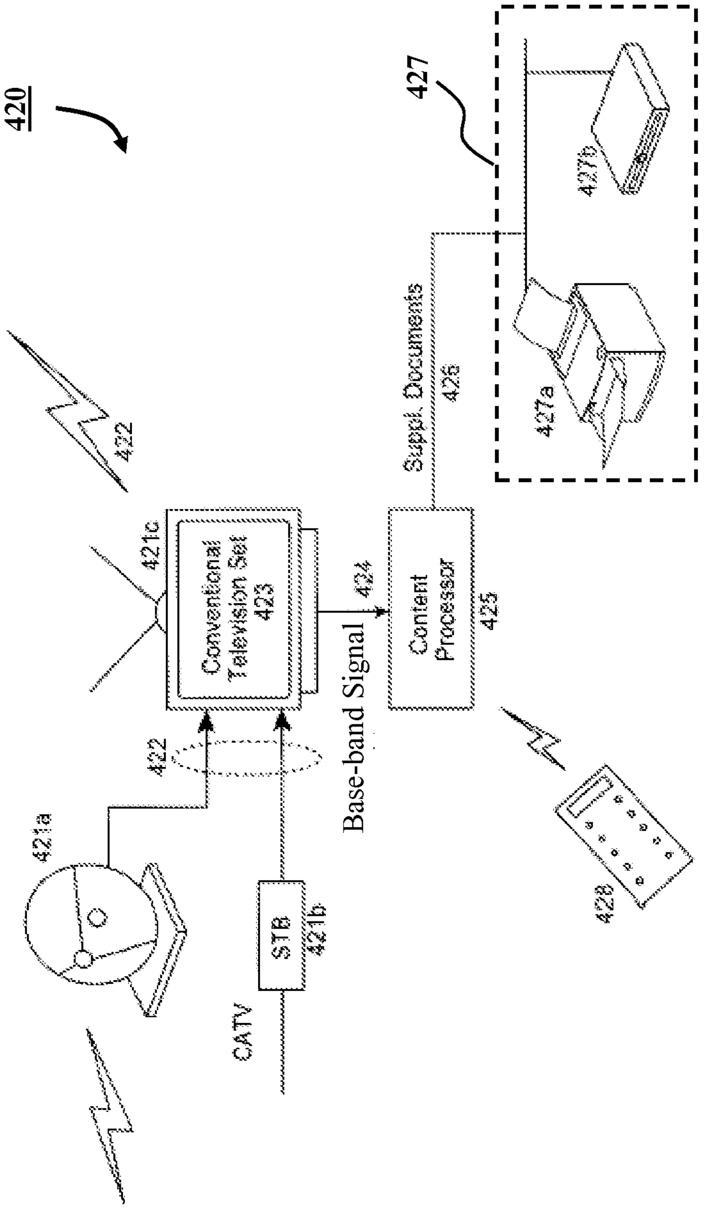
FIG. 4A illustrates a system for processing a received print-augmented broadcast signal in accordance with an embodiment of the present invention.
Figure 4B:
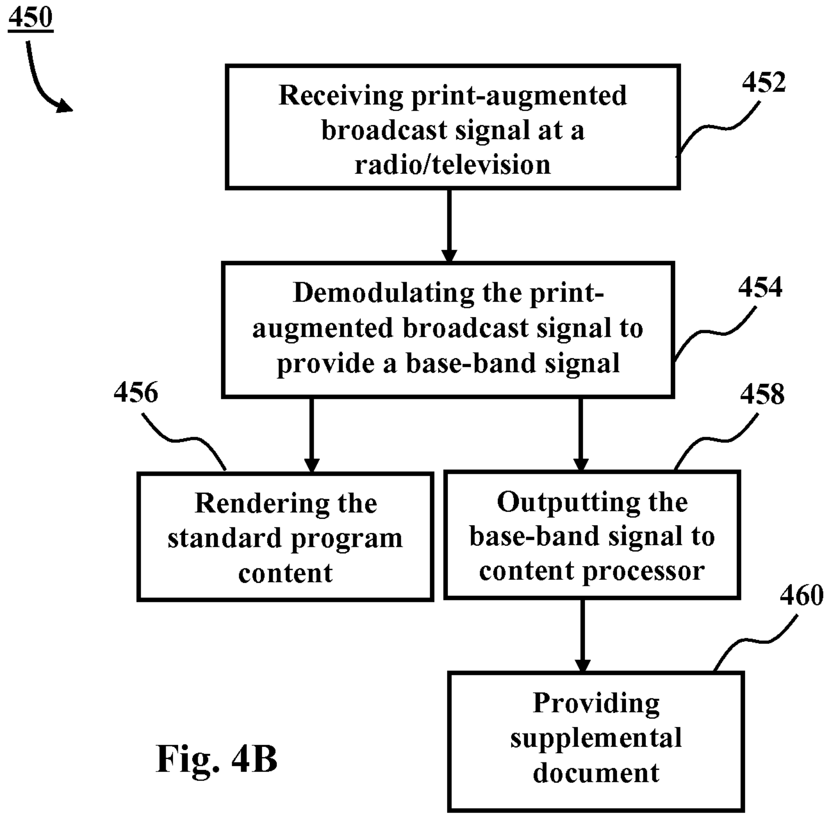
FIG. 4B illustrates a method for processing a received print-augmented broadcast signal in accordance with an embodiment of the present invention.

An embodiment of a system 420 and corresponding method 450 for processing a print-augmented broadcast signal 422 are illustrated in FIGS. 4A and 4B respectively. Referring first to the system 420 illustrated in FIG. 4A, the system 420 includes a receiving means 421 (*a, b, c*), a conventional television set 423, a content processor 425, a content output means 427 (*a, b*), and optionally, a remote controller unit 428. Exemplary receiving means include a satellite receiver 421*a*, a set top box 421*b*, or television aerials 421*c*, each of which is adapted to receive the print-augmented broadcast signal 422 which can be processed by the convention television set 423. The conventional television set 423 renders the standard program content on the television screen in a conventional manner using its internal demodulation circuitry (not shown). At the same time, the demodulated print-augmented broadcast signal (i.e. the base-band signal) 424 is output to the content processor 425, where the supplemental content is extracted therefrom.

The content processor 425 processes the extracted supplemental content to provide supplemental documents 426 which are associated with the standard program content being rendered on the conventional television set 423. Subsequently, the supplemental documents 426 can be output to a printer 427*a* for hardcopy printout or can be stored in a data storage device 427*b*.

In an embodiment, the remote controller unit 428 (the functionality of which may be incorporated into a remote control of the conventional television set 422) can be used to control the downloading processes at the content processor 425. In an embodiment, the remote controller unit 428 is operable to receive the base-band signal whereby the supplemental content 424 corresponding to the currently viewed stand program content is assembled as a supplemental document 426 and delivered to one or more of the output devices 427. In this manner, the viewer can download supplemental content concurrently with little or no disruption in their viewing the program being rendered on the television screen.

FIG. 4B illustrates a method 450 for processing a received print-augmented broadcast signal using the system 420 of FIG. 4A. Initially at step 452, the print-augmented broadcast signal 422 is received (or recovered by the receiving means 421). The received print-augmented broadcast signal 422 is in the format of the original television broadcast signal which can be processed by the conventional television set 423 in the conventional manner. The print-augmented broadcast signal 422 carries both the standard program content and the supplemental content. In step 454, the demodulation circuitry inside the television set 423 is used to demodulate the print-augmented broadcast signal 422 (in the conventional manner) to provide a base-band signal which contains the standard program content and the supplemental content. The standard program content is subsequently rendered on the television screen in the conventional manner in step 456. At substantially the same time, the base-band signal is output to the content processor 425 for processing the supplemental content in step 458.

The content processor 425 is operable to extract the supplemental content from the base-band signal and assembles the supplemental content into one or more printable supplement documents 426 in step 460, the details of which are further described below. The supplemental documents 426 are delivered to output devices 427, which in two exemplary embodiments include a printer 427*a* and a data storage device 427*b*. It should be noted that other output devices may be used alternatively or in addition thereto. Connection between the content processor 425 and the output devices 427 may be realized through various connection protocols, such as USB, IEE1394, SCSI, parallel connections, wireless connections (e.g. Bluetooth, WiFi), and the like communication means.

Figure 4C:
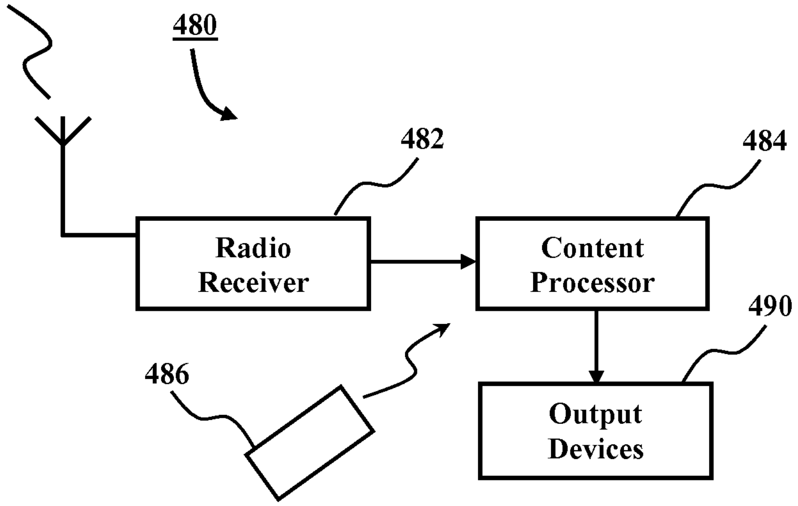
FIG. 4C illustrates a radio system for processing a received print-augmented broadcast radio signal in accordance with an embodiment of the present invention.
Figure 5:
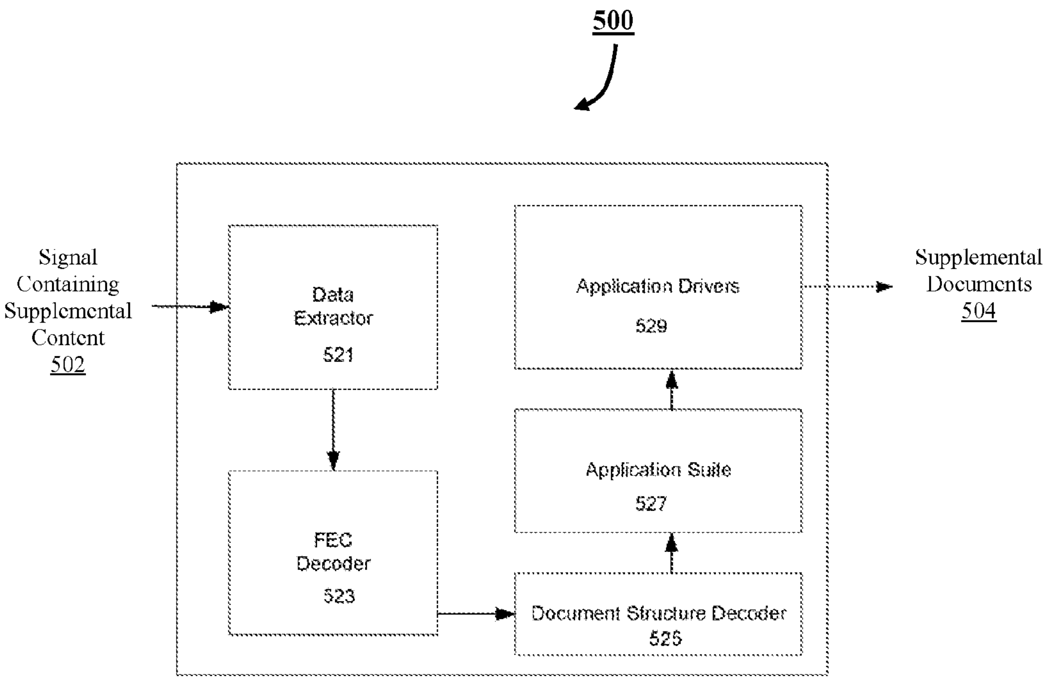
FIG. 5 illustrates a functional block diagram of the content processor shown in FIG. 4A in accordance with an embodiment of the present invention.

FIG. 5 illustrates a functional block diagram of a content processor 500 (such as the content processor 425 shown in FIG. 4) that includes a data extractor 521, an optional forward error correction (FEC) decoder 523, a document structure decoder 525, an application suite 527, and associated application drivers 529. During operation, base-band signal 502 containing the supplemental content is supplied to the content processor 500 and the supplemental content is extracted therefrom. The data extractor 521 functions to decode further embedded supplemental content, for examples applets or programming, within the supplemental content. Additional operations within the data extractor 521 may include parsing the supplemental content into segments, if this format is needed and the recovered supplemental content is not so arranged.

Once the supplemental content data is extracted, the supplemental content data is decoded using an FEC decoder 523 and is output to a document structure decoder 525. Other data codecs (if any at all) may be used provided the content modulator 324 (as shown in FIG. 3) and the content processor 425 (as shown in FIG. 4) implement complementary codecs.

In an embodiment, the supplemental content (which may include more than one segment, as described above) is recovered in the form of structured data, such as XML-formatted data. In such an embodiment, a document structure decoder 525 is employed to decode the meta-data, or some such similar content used in another structured document. The decoded data is supplied to an application suite 527 which further assembles the data into the desired format for a particular application. Application drivers 529 are operable to interface with a particular output device 427, and may be incorporated within the application suite 527 in an alternative embodiment. The appropriately formatted data, referred to herein as a supplemental document 426, is subsequently provided to one or more of the output devices 427.

The content processor 500 may further include a remote controller interface module (not shown) that is responsive to various command signals from a remote controller unit for performing one, some, or all of the aforementioned content processor functions. As an example, the content processor 425 continually processes a stream of supplemental content segments as described in relation to the content server 321 of FIG. 3A. Each supplemental content segment includes supplemental content corresponding to, and synchronized with, a segment of the standard program content. When the viewer is presented with a topic about that the viewer would like to acquire more information on, the viewer actuates the appropriate buttons on the remote controller unit. The signal produced thereby in turn activates the application structure decoder 525, application suite 527 and application drivers 529 to generate the supplemental document for output by one or more of the output devices. In this manner, the corresponding content segment can be downloaded (as a printed or stored electronic document, for instance) quite conveniently with minimal disturbance to the viewing experience.

Radio Print-Augmented Broadcast Signal

The system 320 and method 350 of FIGS. 3A and 3B can also be used to compose, provide, and transmit print-augmented broadcasts for radio signals. As an example, a digital audio broadcasting (DAB) system employs a non-program audio signal component known as a program associated data (PAD) channel, which can be used as the vehicle for transporting the supplemental content. In such an embodiment, the system 320 and corresponding method 350 can be used in substantially the same manner, as described in the foregoing, for receiving and processing a DAB broadcast signal of a DAB program, and a supplemental content corresponding to the DAB program. The supplemental content is provided by a content server 321. The content modulator 324 which is adapted for processing the DAB broadcast signals is used to modulate the supplemental content onto the PAD channel of the DAB signal, thereby forming a radio (DAB) print-augmented broadcast signal. The specific modulation process is a known art and is governed by the DAB broadcasting standards. The radio print-augmented broadcast signal can then be transmitted via the conventional means, exemplary embodiments which may include satellite, cable or tower transmitters.

Likewise, similar system and method to those of FIGS. 4A and 4B may be used for receiving and processing the radio print-augmented broadcast signal. In an exemplary embodiment, a radio system 480 for receiving and processing a radio signal of the aforementioned DAB standard is shown in FIG. 4C. The radio system 480 includes a radio receiver 482 for receiving a radio print-augmented broadcast signal. Additionally, the radio receiver 482 includes a demodulator or other such circuitry operable to demodulate the received radio signal to provide a base-band signal containing the DAB program and supplemental content. The radio system 480 further includes a content processor 484 for receiving the base-band signal and extracting the supplemental content therefrom. The supplemental content is then assembled to provide one or more printable supplement documents, which, for instance, by using a remote controller unit 486, can be delivered to an output device 490. The output device 490 can be a printer, data storage device, PDA, PC, and the like electronic devices.

Figure 6A:
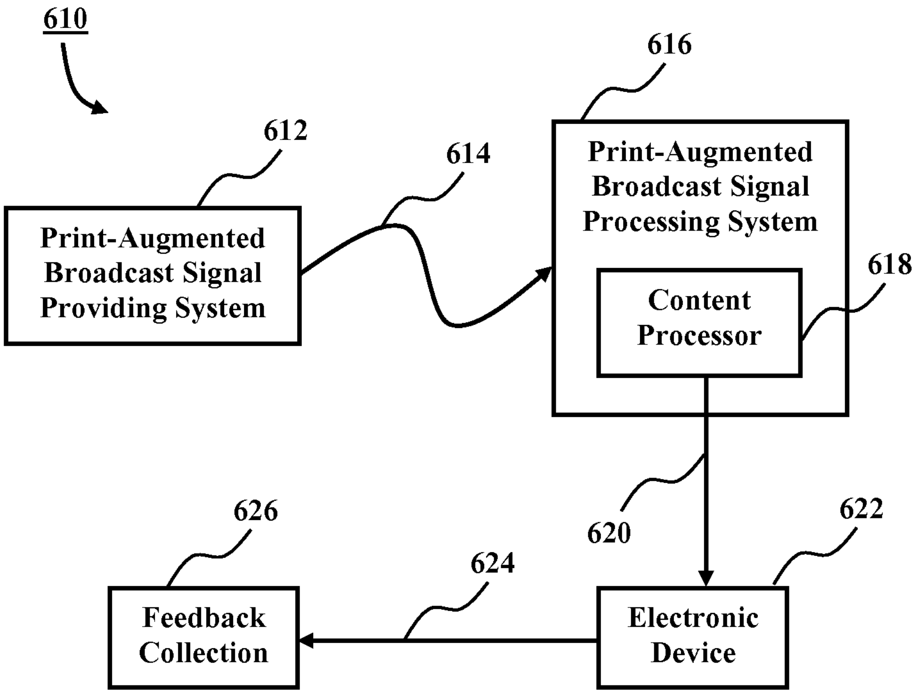
FIG. 6A illustrates a system for soliciting feedback from an audience in accordance with an embodiment of the present invention.
Figure 6B:
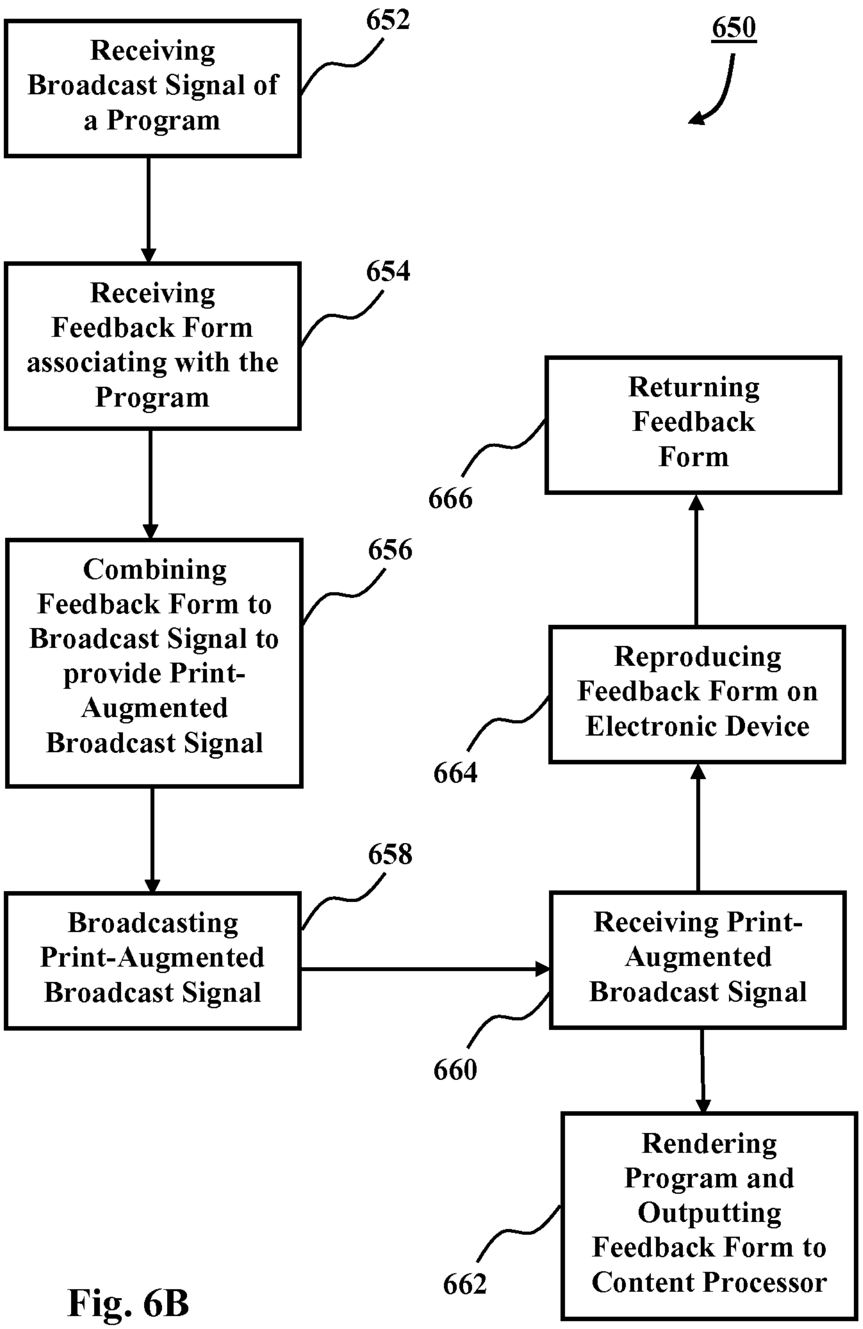
FIG. 6B illustrates a method for soliciting feedback from an audience in accordance with an embodiment of the present invention.

In an embodiment, the systems and methods described in the foregoing can be used for soliciting feedback from the audience as described hereinafter with reference to FIGS. 6A and 6B. In many broadcasting situations, whether radio or television, audience feedbacks are important. However, in most cases, it is not sufficient to solicit YES or NO answers from the audience. FIGS. 6A and 6B respectively illustrate a system 610 and method 650 for soliciting feedback from the audience using print-augmented broadcast signal by providing a feedback form therewith.

The system 610 as shown in FIG. 6A includes a print-augmented broadcast signal providing system 612, a print-augmented broadcast signal processing system 616, an electronic device 622, and a feedback collection entity 626. In this exemplary embodiment, the print-augmented broadcast signal providing system 612 and the print-augmented broadcast signal processing system 616 are similar in makeup to the systems shown in FIGS. 3A and 4A (and 4C) as described in the foregoing, respectively. A feedback form (not shown) associating with a standard program content is provided as a supplemental content to the print-augmented broadcast signal providing system 612. The feedback form is modulated onto the non-program portion of the broadcast signal of the program to provide a print-augmented broadcast signal 614 for broadcasting in the conventional manner (i.e. television or radio broadcasting). At the receiving end, the print-augmented broadcast signal 614 is received by the print-augmented broadcast signal processing system 616. The print-augmented broadcast signal processing system 616 subsequently demodulates the received print-augmented broadcast signal 614 to provide a base-band signal containing the program content and the supplemental content, which is the feedback form in this case. The base-band signal is output to the content processor 618 where the feedback form is extracted and further processed.

Subsequently, the content processor 618 may, upon the audience issuing a command by using a remote controller (such as the one shown in FIG. 4A), delivers the feedback form to the electronic device 622 via a link 620 for soliciting feedback from the audience. The electronic device 622 can be SMS, a WAP or GPRS enabled cell phone, PDA, or a PC. Accordingly, the link 620 can be a wireless connection such as Bluetooth or WiFi, or wired connection such as USB, serial, or parallel connections. The electronic device 622 is registered with the content processor 618 in order to receive the feedback form. However, not all electronic devices registered with the content processor 618 need to receive the feedback form every time a command is given. The content processor 618 can be provided with a user option to select which of the electronic devices registered therewith should receive the feedback form and only sends a copy to the electronic devices specified therein. Further, the content processor 618 can be provided with an application that includes an application logic to determine which of the registered electronic devices should be forwarded which kind of data. The application logic can encompass forwarding all data to all registered devices to only sending data based on user preference or prior user requests.

The electronic device 622 provides the interface between the audience and the feedback form. The electronic device 622 can be provided with a simple application for form browsing and selection. Thus, upon receiving the feedback form, the application is launched, allowing the audience to browse the feedback form. Using the electronic device 622, the audience can provide the relevant information in the feedback form and returns the completed feedback form to the broadcaster or the feedback collection entity 626 via a link 624. Link 624 is an existing communication infrastructure of the electronic device 622 such as a cellular network, Internet connection, land line, fax line, and the like communication links depending on the type of the electronic device 622. Thus, link 624 serves as a feedback channel for the mono-direction link between a broadcast station and a conventional receiver. For example, if the electronic device 622 is a cell phone, the completed feedback form is returned to the feedback collection entity 626 via the cell phone cellular network. If the electronic device 622 is a PC, the completed feedback form can be sent back to the feedback collection entity 626 via an Internet connection using email or any other acceptable file transfer protocols. Alternatively, if the electronic device 622 is a printer, the audience can complete the feedback form printed by the printer and faxes back the completed feedback form using a fax machine connecting to a telephone line.

The feedback form can be of any design, layout and length depending on the type of feedback or information required from the audience. The feedback form is in a format such as a word document, HTML page, rich text, or an electronic form which is readable and displayable by the electronic device 622. In the feedback form, all the fields are pre-filled wherever possible in order to make it a less tedious experience for the audience. Such pre-filled information can include certain profile data of the user such as name, address, gender, preferences, and so on. Further, for convenience, the feedback form can be embedded with return addresses such as emails, fax numbers, and the like electronic responding means. Therefore, if the electronic device 622 is a PC, PDA, or cell phone, a software script can be provided in the electronic device 622 to automatically retrieve a return address and automatically sends back the completed feedback form without requiring the audience to re-enter the appropriate return address.

The method 650 for soliciting feedback from audience using a print-augmented broadcast signal as shown in FIG. 6B includes receiving a broadcast signal of a program in step 652. The program can be a television or radio broadcast show relating to movies, news, sports, current affairs, and so on. The broadcast signal includes a standard program portion and a non-program portion. The content of the program is carried in the standard program portion of the broadcast signal. In step 654, a feedback form associating with the program is received. The feedback form may contain leading questions and selection options relating to the program to facilitate audience feedback. The feedback form may also contain return addresses such as email addresses, telephone numbers, and fax numbers. The feedback form, being an example of the supplemental content, is modulated onto the non-program portion of the broadcast signal to provide a print-augmented broadcast signal in step 656. The print-augmented broadcast signal contains both the program content and the feedback form associating thereto and has the same format as the original broadcast signal of the program. Thus, the print-augmented broadcast signal can be broadcasted and received in the same manner as a conventional television or radio broadcast signal. The print-augmented broadcast signal is broadcasted to conventional receivers in step 658.

The broadcasted print-augmented broadcast signal is received by a conventional receiver in step 660. The conventional receiver processes the print-augmented broadcast signal in the conventional manner. Typically, step 660 includes demodulating the received print-augmented broadcast signal to provide a base-band signal containing the program content and the feedback form. In the case where the print-augmented broadcast signal is a radio signal, the conventional receiver is a radio receiver and it renders the program content to the listener in audio form. In the case where the print-augmented broadcast signal is a television signal, the convention receiver is a television set and it renders the program content on the television screen. The act of rendering the program content is performed in step 662.

At substantially the same time of rendering the program content, the base-band signal is output to a content processor in step 664. The content processor, as described in the foregoing with reference to FIGS. 4A and 5, recovers the feedback form from the base-band signal and delivers feedback form to an electronic device. The act of delivering the feedback form to the electronic device can be accomplished in any number of known ways. This includes sending the feedback form electronically to the electronic device via a wireless connection or a wired connection. The electronic device can be a cell phone, PDA, or a PC and is provided with a feedback form browser or suitable application for displaying the feedback form and receiving inputs from the audience. Upon receiving the feedback form, the electronic device reproduces the feedback form for interfacing with and soliciting inputs from the audience.

Once the audience has completed providing feedback, the completed feedback form is returned in step 666. The act of returning the feedback form can be automated by providing a software script executable on the electronic device. Upon clicking on a submit or return button provided by the feedback form displaying application, the return addresses embedded in the feedback form are retrieved and the completed feedback form is automatically sent to the specified return addresses via the communication infrastructure of the electronic device. For example, if the electronic device is a cell phone, the feedback form is returned via the cellular network. If the electronic device is a PC, the feedback form is returned via the email through the Internet. In other words, the feedback mechanism is achieved using the communication infrastructure of the respective electronic device. Alternatively, if the electronic device is a printer, the feedback form can be printed and once information is provided by the audience, the completed form may then be faxed back to the addressee using a fax machine. In another embodiment, the return address can be a surface mail address where the audience may mail back the completed feedback form.

The embodiment described in the foregoing concerns providing a feedback form associating with a program. In an alternative embodiment, a number of feedback forms may be provided, wherein each feedback form associates with a segment of the program. Accordingly, each of the feedback forms is combined with the respective segments of the non-program portions of the broadcast signal that corresponds with the respective segments of the program portions of the broadcast signal.

As readily appreciated by those skilled in the art, the described processes may be implemented in hardware, software, firmware or a combination of these implementations as appropriate. For example, the processes of modulating and broadcasting signals may be carried out by hardware component modulators and transmitter systems operable to modulate and broadcast signals at the desired frequency and in the desired format. The described content processor may employ a combination of hardware front-end receiver components operable to additionally demodulate and/or condition the received supplemental content, and firmware/software operable to FEC decode the supplemental content and to store/process the resultant data as well as the output applications and device drivers. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

The foregoing description is presented for purposes of illustration and description. It is not intended to be exhaustive or to limit the invention to the precise form disclosed, and obviously many modifications and variations are possible in light of the disclosed teaching. The described embodiments are chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A method for soliciting feedback from an audience comprising:

receiving an augmented signal from a content distributor to be processed, the augmented signal having a program content and a feedback form relating to the program content;

demodulating the augmented signal to generate a base-band signal;

extracting the program content from the base-band signal for rendering on a television screen of a television set;

forwarding the base-band signal to a remote controller;

using the base-band signal forwarded to the remote controller to extract the feedback form for delivery to one or more electronic devices, external to the television set, in response to a command of a user of the television screen; and forwarding, to the content distributor, the feedback form from the one or more electronic devices after the feedback form has been provided with feedback information by the user, via a communication infrastructure comprising at least one of a cellular network, an Internet connection, and a fax line.

2. The method of claim 1, further comprising:

delivering the feedback form extracted from the base-band signal to a printer for printing the feedback form.

3. The method of claim 1, further comprising receiving a broadcast signal of a program, the broadcast signal comprising a program portion and a non-program portion, the program portion containing the program content;

receiving the feedback form associated with the program content; and combining the feedback form onto the non-program portion to provide the augmented signal.

4. The method of claim 3, wherein receiving the broadcast signal comprises receiving a television broadcast signal having a horizontal blanking interval for use as the non-program portion.

5. The method of claim 3, wherein receiving the broadcast signal comprises receiving a digital audio broadcasting signal having a program associated data channel for use as the non-program portion.

6. The method of claim 3, wherein receiving the broadcast signal comprises receiving a television broadcast signal having a vertical blanking interval for use as the non-program portion.

7. The method of claim 3, wherein receiving the feedback form from the one or more electronic devices comprises receiving the feedback form having at least one return address of the content distributor, the return address being at least one of email address, telephone number, fax number, and surface mail address.

8. The method of claim 7, further comprising providing a software application operable on the one or more electronic devices for automatically retrieving the return address from the feedback form and forwarding the feedback form to the content distributor identified by the return address.

9. The method of claim 3, wherein the feedback form received from the content distributor comprises multiple feedback segments including questions and selection options relating to the program content to facilitate audience feedback.

10. The method of claim 9, wherein combining the feedback form comprises combining each feedback segment onto the non-program portion corresponding with the program portion of the specific segment of the program content.

11. The method of claim 3, wherein receiving the feedback form comprises receiving a feedback form having pre-filled information relating to the audience.

12. The method of claim 3, further comprising:

extracting the feedback form from the base-band signal at a broadcast receiver for delivery to the one or more electronic devices in response a command of the remote controller controlling the television set.

13. The method of claim 1, wherein the content processor provides an option to select which of the one or more electronic devices to receive the extracted feedback form.

14. A system for soliciting feedback from an audience comprising:

a broadcast receiver to receive, from a content distributor, an augmented broadcast signal comprising a broadcast signal of a program combined with a feedback form associated with the program, wherein the augmented broadcast signal is to be demodulated to generate a base-band signal to extract program content to be rendered on a television screen of a television set;

a remote controller to receive the base-band signal; and a content processor to extract the feedback form from the base-band signal received by the remote controller for delivery to one or more electronic devices, external to the television set, in response to a command of a user of the television screen, and to forward the feedback form to the content distributor from the one or more electronic devices after the feedback form has been provided with feedback information by the user, via at least one of a cellular network, an Internet connection, and a fax line.

15. The system of claim 14, wherein the broadcast signal comprises a television signal having a program portion for carrying the program and a non-program portion for carrying the feedback form, the non-program portion being a vertical blanking interval of the television signal.

16. The system of claim 14, wherein the broadcast receiver comprises a television receiver operable to process at least one of NTSC, PAL, SECAM, and HDTV television broadcast signals.

17. The system of claim 14, wherein the broadcast signal comprises a digital audio broadcast signal having a program portion for carrying the program and a non-program portion for carrying the feedback form, the non-program portion being a program associated data channel.

18. The system of claim 17, wherein the broadcast receiver comprises a DAB radio receiver.

19. The system of claim 14, wherein the feedback form extracted from the base-band signal is delivered to the one or more electronic devices via at least one of the wired connection, Bluetooth connection and WiFi connection.

20. The system of claim 14, wherein the one or more electronic devices further comprises a software application for interfacing the user with the feedback form and providing information into the feedback form.

21. The system of claim 14, wherein the feedback form comprises pre-filled information associating with the user.

22. The system of claim 14, wherein the feedback form forwarded to the content distributor includes at least one return address of the content distributor, the return address being at least one of email address, telephone number, fax number, and surface mail address.

23. The system of claim 22, wherein the one or more electronic devices further comprises a software application for presenting the feedback form to the audience, automatically retrieving the return address and returning the feedback form using the return address upon invoking by the audience.

24. The system of claim 14, wherein the feedback form is extracted from the base-band signal and delivered to the one or more electronic devices in response a command of the remote controller controlling the television set.

25. The system of claim 14, wherein the content processor provides an option to select which of the one or more electronic devices to receive the extracted feedback form.

* * * * *

UNITED STATES PATENT AND TRADEMARK OFFICE

CERTIFICATE OF CORRECTION

PATENT NO. : 8,667,523 B2
APPLICATION NO. : 11/572818
DATED : March 4, 2014
INVENTOR(S) : Ajay Gupta It is certified that error appears in the above-identified patent and that said Letters Patent is hereby corrected as shown below:

In the Claims

In column 14, line 35, in Claim 12, delete “response” and insert -- response to --, therefor.

In column 16, line 13, in Claim 24, delete “response” and insert -- response to --, therefor.

Signed and Sealed this
Twenty-fourth Day of June, 2014

Michelle K. Lee

Michelle K. Lee
*Deputy Director of the United States Patent and Trademark Office*